United States Patent
Wang et al.

(10) Patent No.: US 11,989,237 B2
(45) Date of Patent: May 21, 2024

(54) NATURAL LANGUAGE INTERACTION WITH AUTOMATED MACHINE LEARNING SYSTEMS

(71) Applicant: International Business Machines Corporation, Armonk, NY (US)

(72) Inventors: Dakuo Wang, Cambridge, MA (US); Ming Tan, Malden, MA (US); Chuang Gan, Cambridge, MA (US); Haoyu Wang, Somerville, MA (US); Mo Yu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 16/551,021

(22) Filed: Aug. 26, 2019

(65) Prior Publication Data

US 2021/0064666 A1    Mar. 4, 2021

(51) Int. Cl.
G06F 16/9032 (2019.01)
G06N 5/04 (2023.01)

(52) U.S. Cl.
CPC ......... *G06F 16/90332* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,725,408 B2 | 5/2010 | Lee et al. | |
| 2009/0006399 A1* | 1/2009 | Raman | G06F 16/2456 |
| 2009/0119095 A1 | 5/2009 | Beggelman et al. | |
| 2015/0356085 A1* | 12/2015 | Panda | G06N 5/04 |
| | | | 707/748 |
| 2017/0293681 A1 | 10/2017 | Blandin et al. | |
| 2018/0150749 A1* | 5/2018 | Wu | G06F 16/9535 |
| 2018/0302348 A1 | 10/2018 | Ganescu et al. | |
| 2018/0322414 A1 | 11/2018 | Jayaraman | |
| 2019/0354599 A1* | 11/2019 | Mital | G06N 20/00 |
| 2019/0384762 A1* | 12/2019 | Hill | G06F 16/2272 |

FOREIGN PATENT DOCUMENTS

WO    WO 2018/195307 A1    10/2018

OTHER PUBLICATIONS

Mel, et al. "The NIST Definition of Cloud Computing". Recommendations of the National Institute of Standards and Technology, Nov. 16, 2015.
Y. Matsuo et al., "Natural Language Processing Supporting Artificial Intelligence", NTT Technical Review 2016.https://www.ntt-review.jp/archive/ntttechnical.php?contents=ntr201605fa2.pdf&mode=show_pdf.
Cassell et al., "Embodied Conversational Agents" Book Description, MIT press, 2000, 4 pages.
He et al., "AMC: AutoML for Model Compression and Acceleration on Mobile Devices", ECCV 2018, 17 pages.

* cited by examiner

*Primary Examiner* — Thu N Nguyen
(74) *Attorney, Agent, or Firm* — Kelsey M. Skodje

(57) ABSTRACT

An artificial intelligence (AI) interaction method, system, and computer program product include selecting an artificial intelligence model to respond to a query to generating a response to the query using the selected artificial intelligence model, and receiving the response to the query from the selected artificial intelligence model.

20 Claims, 6 Drawing Sheets

NATURAL LANGUAGE INTERACTION WITH AUTOMATED MACHINE LEARNING SYSTEMS

BACKGROUND

The present invention relates generally to an artificial (AI) intelligence interaction method, and more particularly, but not by way of limitation, to a system, method, and computer program product for a generalizable natural language processing system for all existing Automated Data Science (AutoAI) systems that enables users to communicate with AutoAI through conversation.

Automated Machine Learning (AutoAI or AutoML) systems refer to a kind of technology that automate the whole end-to-end data science workflow, from loading in the data from its various sources, to identifying useful features and generating new features if needed, and then at last to building a machine learning model code that can use some of the features to predict another feature in the data.

AutoML is a fairly new approach and it includes a bundle of techniques, such as auto-model-selection, auto-data-cleaning, etc. Conventionally, AutoML can only be appreciated by experienced data scientists and conventional approaches use a graphical user interface (GUI).

SUMMARY

In an exemplary embodiment, the present invention provides a computer-implemented artificial intelligence (AI) interaction method, the method including selecting an artificial intelligence model to respond to the query based upon the artificial intelligence configuration files, using the selected artificial intelligence model to generate a response to the query using the received dataset, and receiving the response to the natural language query from the selected artificial intelligence model.

One or more other exemplary embodiments include a computer program product and a system, based on the method described above.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
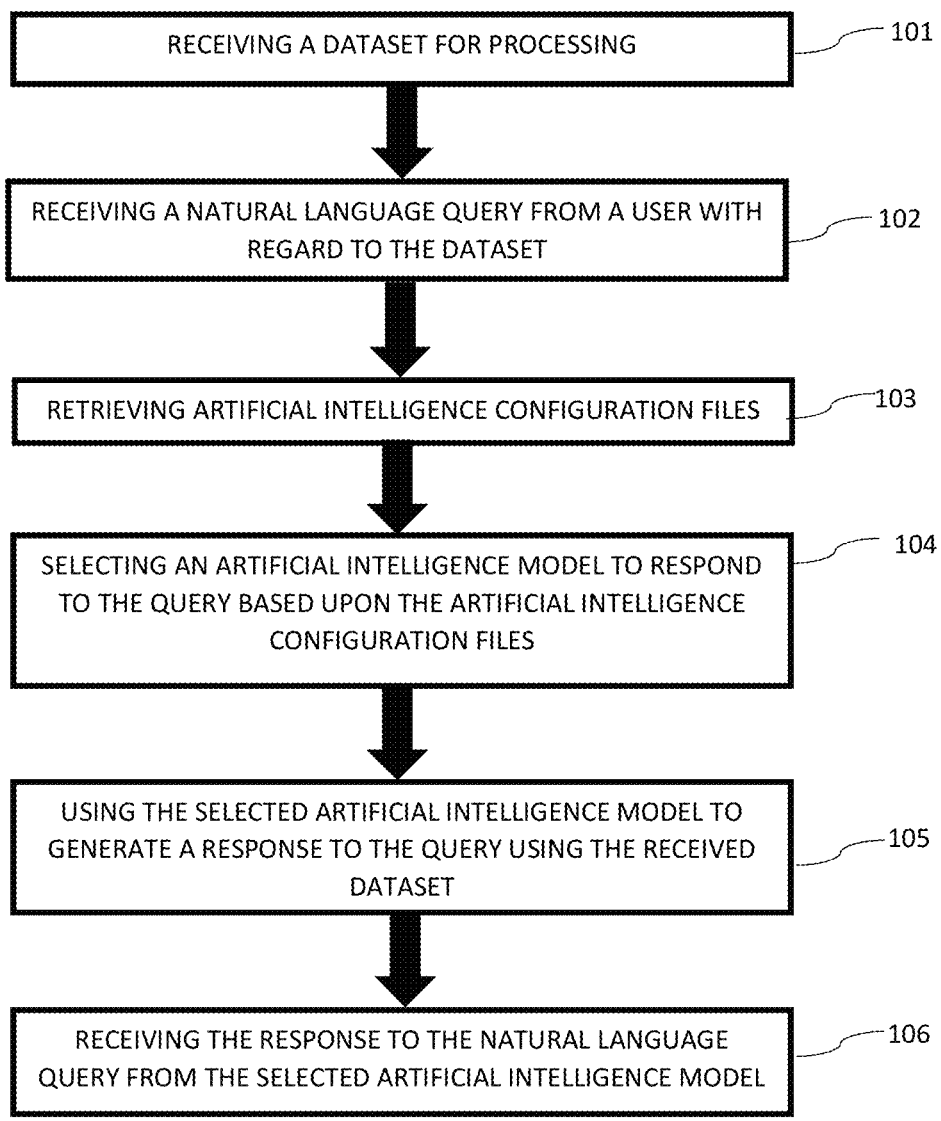
FIG. 1 exemplarily shows a high-level flow chart for an artificial intelligence interaction method 100 according to an embodiment of the present invention.

The invention will now be described with reference to FIGS. 1-6, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of an artificial intelligence interaction method 100 according to the present invention can include various steps for empowering non-data science users to use AutoML by providing a natural language user interface.

Figure 4:
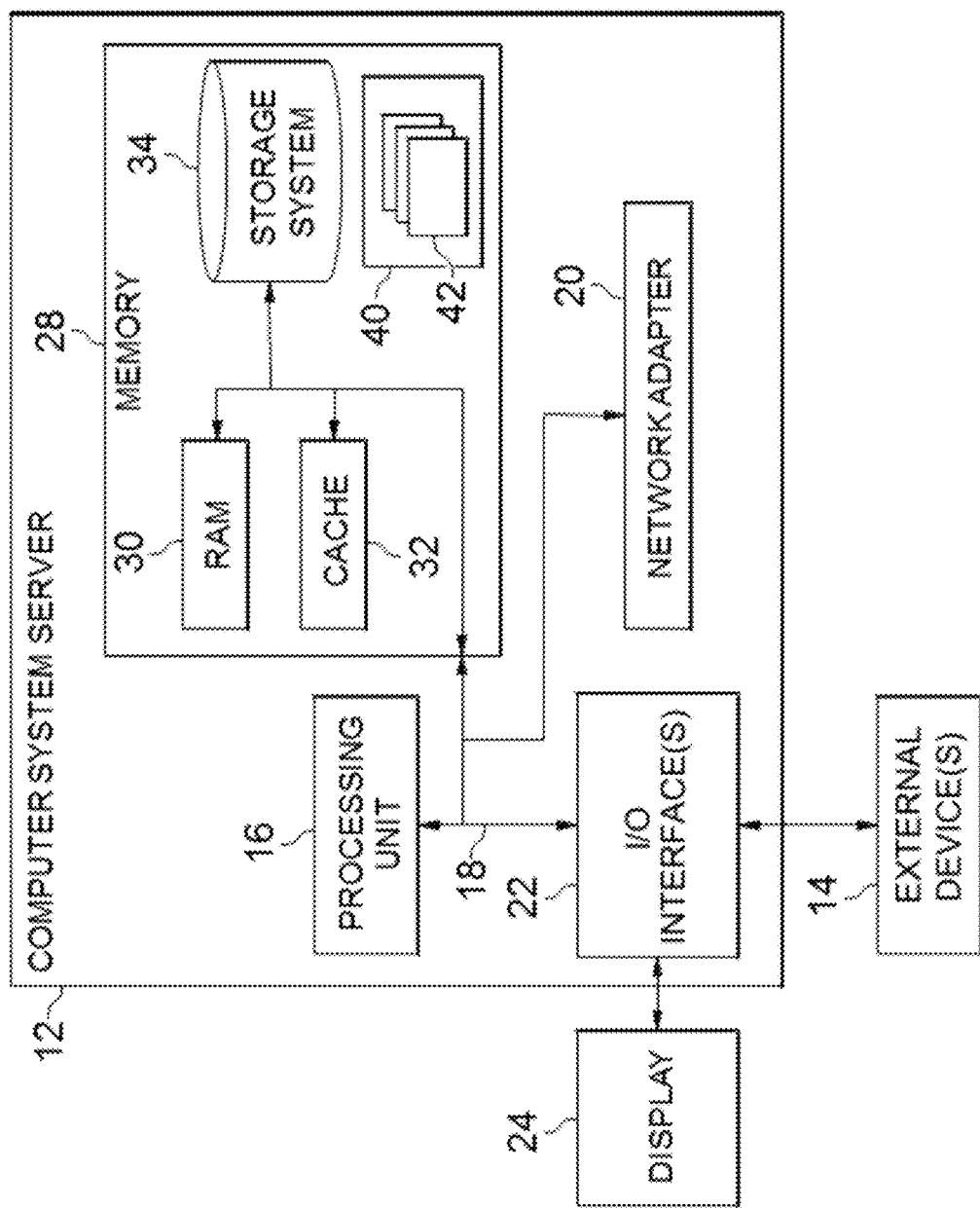
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

Figure 2:
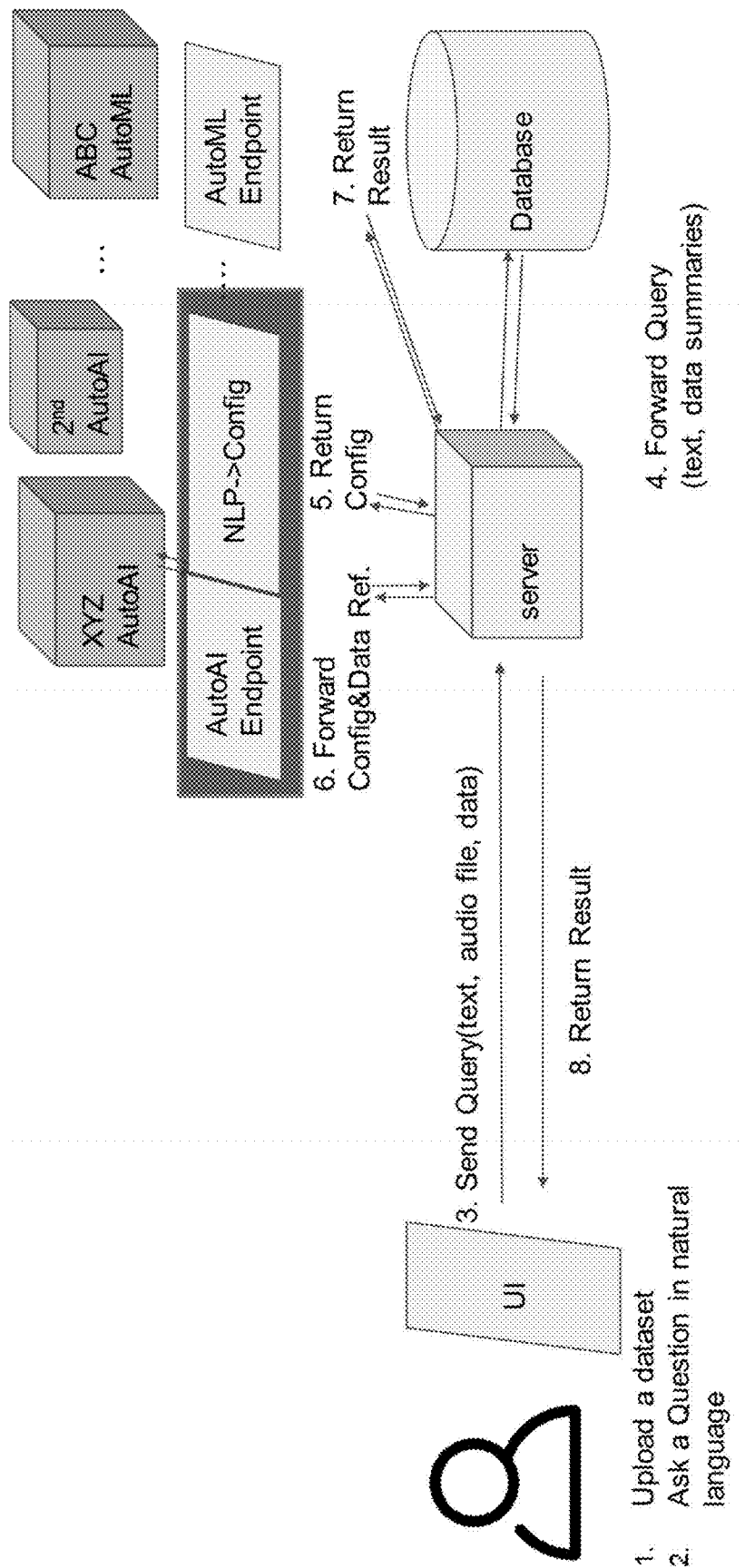
FIG. 2 exemplarily depicts an example system architecture of the artificial intelligence interaction system according to an embodiment of the present invention.
Figure 3:
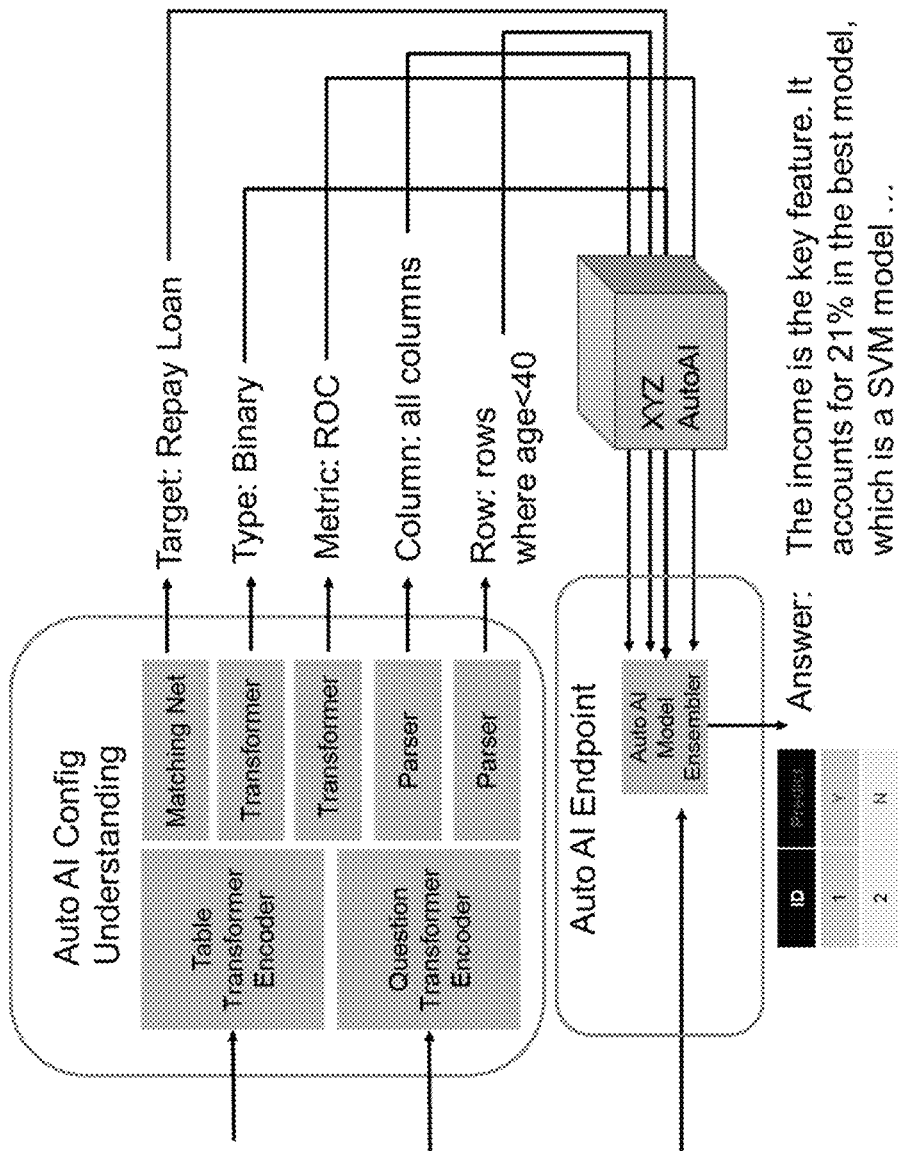
FIG. 3 exemplarily depicts an example of artificial intelligence interaction according to an embodiment of the present invention.

In general, with reference to FIGS. 1-3, a user loads a data into an AutoAI system, and also types a natural language question sentence desired to be answered (e.g., steps 1 and 2 of FIG. 2). On top of existing AutoAI systems, the invention builds a database and an interface that can store and handle the user's natural language question sentence (e.g., steps 3, 7, and 8 of FIG. 2). An exemplary algorithm in this AutoAI Natural Language Processing (NLP) Module is a technique that takes both the user's data input and sentence input at substantially the same time, and generates a configuration as an output that the existing AutoAI systems can understand. Because there are various AutoAI systems, the invention anticipates this configuration output can be tailored for the target system (e.g., steps 5 and 6 of FIG. 2).

With reference to FIG. 3, the invention first encodes the description for each column within a table input from a database using a Transformer Encoder, which may be a multi-layer self-attention neural network. This provides a feature representation for each column.

The invention then encodes the query (e.g., "What is the major factor for repaying the loan for people younger than 40?") for the AutoAI system using the same Transformer Encoder to project the query to the same feature space of the column description.

For each column feature representation, the invention concatenates it with the query feature representation to form a joint representation of the column and the query. The concatenated feature representation will then be used in a matching network to decide the "closeness" (e.g., the similarity such as a query sentence asks "application approval" will have higher similarity to the column with a header "approve" than to the one with a header "name") of a query to a given column. By repeating the aforementioned process for each column feature representation, the invention will end up having a closeness score of a query to each column in the table. The column with the highest score will be predicted as the target column in which the AutoAI user is interested.

Using the representation for the target column, the invention may train a classifier to predict the type of the AutoAI predication together with the evaluation metric, which are required input(s) for an AutoAI system.

By again using the query feature representation, the invention may parse that through a bi-directional Long Short-Term Memory (LSTM) model to predict the column and rows that are related to the query. After generating all the required input(s), the invention can feed that result into the AutoAI system and such a process actually transforms the user's natural language query into the format consumable by the AutoAI system.

That is, the AutoAI model ensembler can store the created model and then answer the query for a new table with the same column headers and data. For example, the AutoAI Model Ensembler can predict if the loan will be repaid for each of the ID 1 and ID 2 of the new table (e.g., "YES"/ "NO" Answer).

With reference now to FIG. 1, the method 100 of FIG. 1 provides a high-level flow of the invention.

In step 101, a dataset for processing is received (e.g., such as a table as shown in FIG. 3). In step 102, a natural language query is received from a user with regard to the dataset (e.g., such as "What is the major factor for repaying the loan for people younger than 40?").

In step 103, AutoAI configurations are retrieved (e.g., such as described above).

In step 104, an artificial intelligence model among all the models generated by AutoAI is selected to respond to the query based upon the artificial intelligence configuration files. This artificial intelligence model is a different model, and it is generated by AutoML. That is, two models are discussed herein with a first model being the invention to map the user's input query and data into a configuration. Then, this configuration goes into the AutoML process, where a second model is generated to answer and to best predict the user's needs.

In step 105, the selected artificial intelligence model is used to generate a response to the query using the received dataset. That is, once the invention has the second model, the user can provide further data into this model, and this model will generate a "Y/N" type of response for the user's input data.

In one embodiment, a natural language response can be output instead of the "Y/N" output.

And, in step 106, the response to the natural language query is received from the selected artificial intelligence model.

Thereby, the invention can provide an AutoAI system for a non-technical user that can simply input a natural language query and, receive an output about a dataset instead of the conventional highly technical configuration by an expert to analyze the dataset.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 4, a computer system/server 12 is shown in the form of a general-purpose computing circuit.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
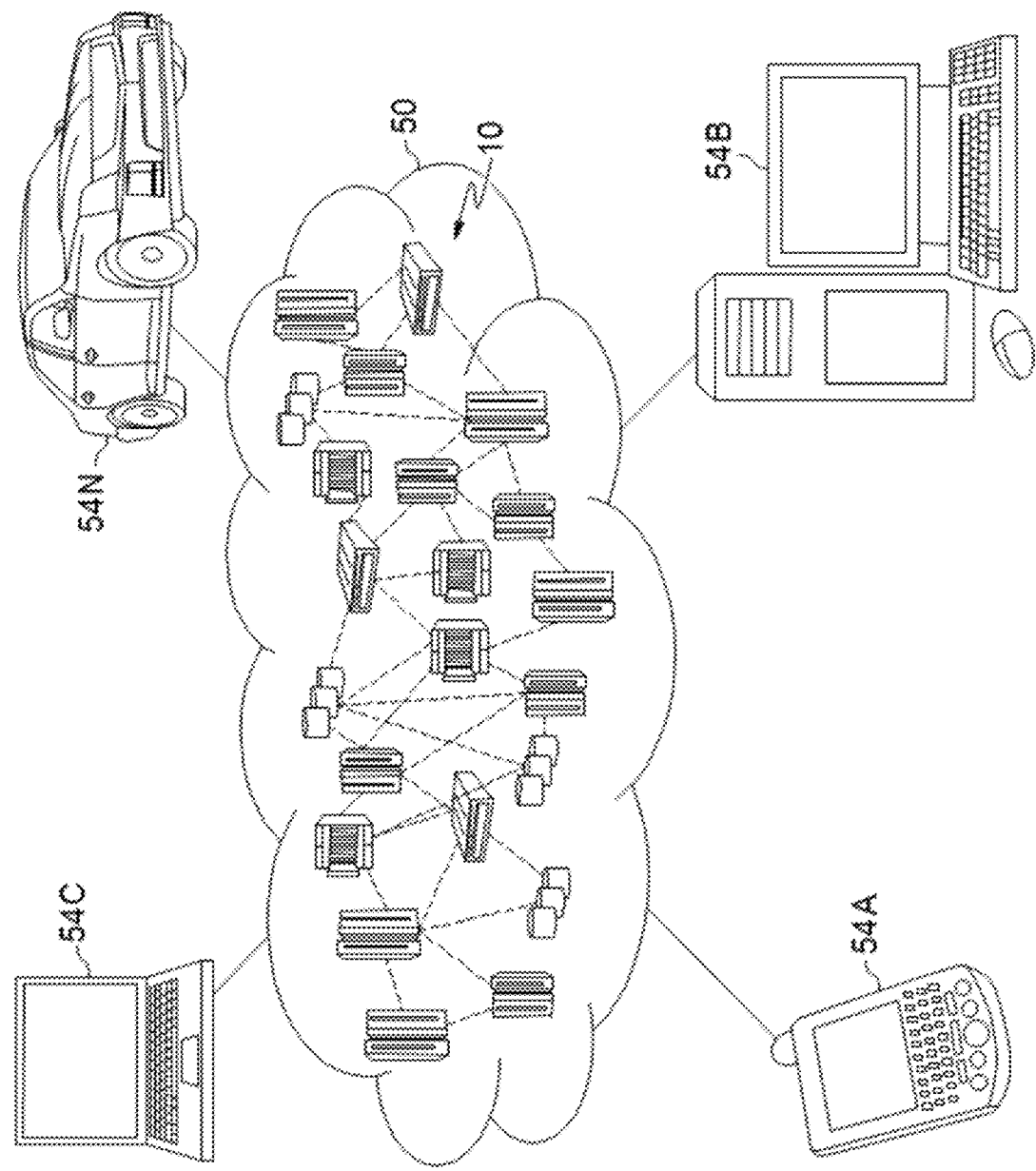
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
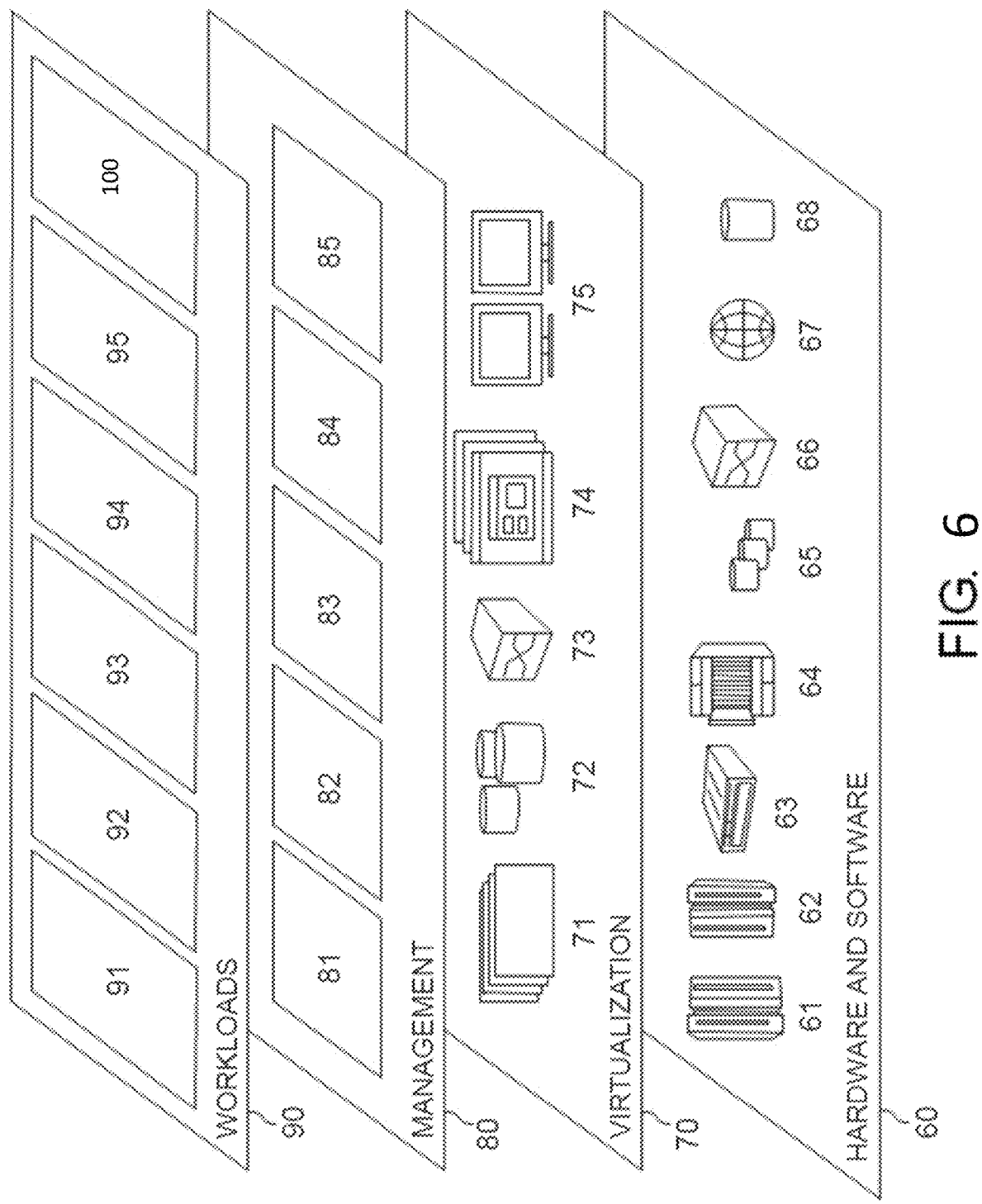
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and artificial intelligence interaction method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented artificial intelligence (AI) interaction method, the method comprising:
    mapping an input provided by a user into a configuration, the input including a query by the user and a dataset initially provided at a time of the query that includes corresponding data within the dataset to answer the query, wherein the configuration is generated from the query and the dataset received at substantially a same time;
    selecting, based on the configuration, an artificial intelligence model to respond to the input based on the artificial intelligence model being capable of processing the corresponding data within the dataset to answer the query;
    generating a response to the query using the selected artificial intelligence model by running the selected artificial intelligence model on the dataset with respect to the query such that the corresponding data is utilized within the selected artificial intelligence model to generate the response; and
    receiving the response to the query from the selected artificial intelligence model.

2. The method of claim 1, wherein the artificial intelligence model responds to the query based on artificial intelligence configuration files.

3. The method of claim 1, wherein the query comprises a natural language query.

4. The method of claim 1, wherein the query comprises a natural language query,
    wherein a first model combines the dataset and the natural language query to the configuration.

5. The method of claim 4, wherein a description for each column within a table input from the dataset is encoded using a transformer encoder to provide a feature representation for each column,
    further comprising encoding the query using the transformer encoder to project the query to a same feature space of the column description, and
    for each of the feature representation, concatenating the feature representation with the query feature representation to form a joint representation of the column and the query.

6. The method of claim 1, embodied in a cloud-computing environment.

7. A computer program product for artificial intelligence (AI) interaction, the computer program product comprising a computer-readable storage medium having program instructions embodied therewith, the program instructions executable by a computer to cause the computer to perform:

mapping an input provided by a user into a configuration, the input including a query by the user and a dataset initially provided at a time of the query that includes corresponding data within the dataset to answer the query, wherein the configuration is generated from the query and the dataset received at substantially a same time;

selecting, based on the configuration, an artificial intelligence model to respond to the input based on the artificial intelligence model being capable of processing the corresponding data within the dataset to answer the query;

generating a response to the query using the selected artificial intelligence model by running the selected artificial intelligence model on the dataset with respect to the query such that the corresponding data is utilized within the selected artificial intelligence model to generate the response; and receiving the response to the query from the selected artificial intelligence model.

8. The computer program product of claim 7, wherein the artificial intelligence model responds to the query based on artificial intelligence configuration files.

9. The computer program product of claim 7, wherein the query comprises a natural language query.

10. The computer program product of claim 7, wherein the query comprises a natural language query, wherein a first model combines the dataset and the natural language query to the configuration.

11. The computer program product of claim 10, wherein a description for each column within a table input from the dataset is encoded using a transformer encoder to provide a feature representation for each column, further comprising encoding the query using the transformer encoder to project the query to a same feature space of the column description, and for each of the feature representation, concatenating the feature representation with the query feature representation to form a joint representation of the column and the query.

12. An artificial intelligence (AI) interaction system, the system comprising:

a processor; and a memory, the memory storing instructions to cause the processor to perform:

mapping an input provided by a user into a configuration, the input including a query by the user and a dataset initially provided at a time of the query that includes corresponding data within the dataset to answer the query, wherein the configuration is generated from the query and the dataset received at substantially a same time;

selecting, based on the configuration, an artificial intelligence model to respond to the input based on the selected artificial intelligence model being capable of processing the corresponding data within the dataset to answer the query;

generating a response to the query using the selected artificial intelligence model by running the selected artificial intelligence model on the dataset with respect to the query such that the corresponding data is utilized within the selected artificial intelligence model to generate the response; and receiving the response to the query from the selected artificial intelligence model.

13. The system of claim 12, wherein the artificial intelligence model responds to the query based on artificial intelligence configuration files.

14. The system of claim 12, wherein the query comprises a natural language query.

15. The system of claim 12, wherein the query comprises a natural language query, wherein a first model combines the dataset and the natural language query to the configuration.

16. The system of claim 15, wherein a description for each column within a table input from the dataset is encoded using a transformer encoder to provide a feature representation for each column, further comprising encoding the query using the transformer encoder to project the query to a same feature space of the column description, and wherein, for each of the feature representation, concatenating the feature representation with the query feature representation to form a joint representation of the column and the query.

17. The method of claim 1, wherein the configuration is processed by a first model that is different than the artificial intelligence model.

18. The method of claim 1, wherein, at the same time, the user provides the query and the dataset that has data within the dataset of which the artificial intelligence model runs against the dataset to find the answer to the query.

19. The method of claim 1, wherein the selected artificial intelligence model is selected from a set of models generated by automated machine learning.

20. The method of claim 1, further comprising outputting the configuration in an automated machine learning model format.

\* \* \* \* \*